March 24, 1970      S. HEDELMAN      3,502,890
ROTATING SPHERE RADIOMETER
Filed June 10, 1965      3 Sheets-Sheet 1
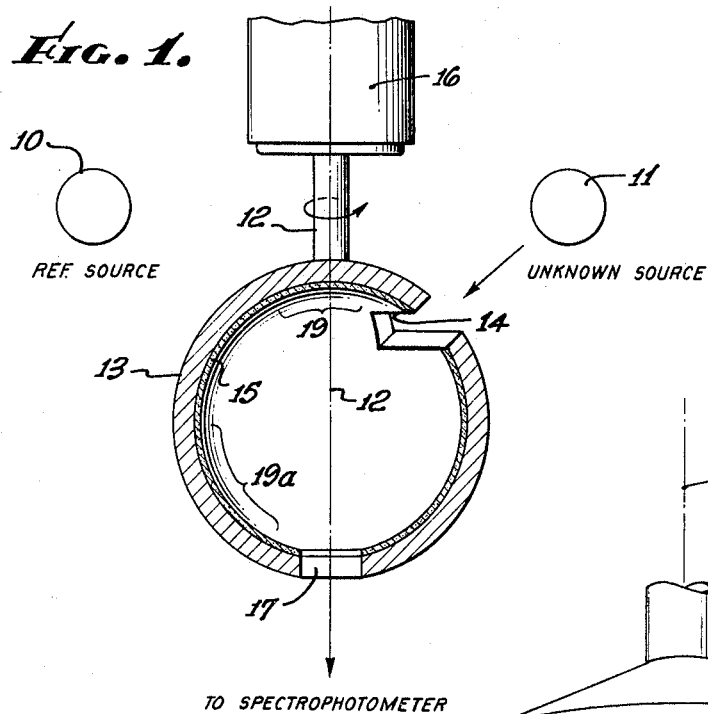
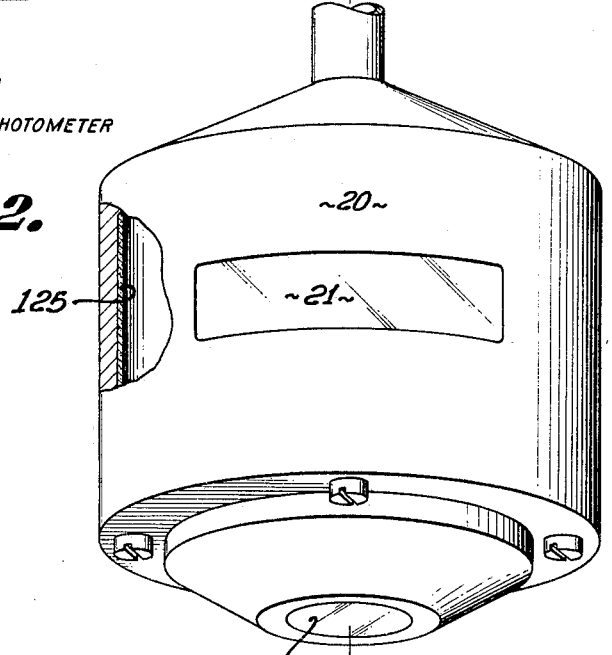
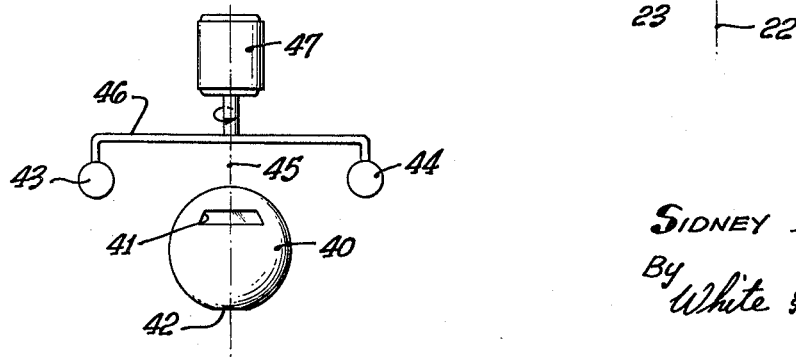
INVENTOR.
SIDNEY HEDELMAN
By White & Haefliger
ATTORNEYS.

INVENTOR.
SIDNEY HEDELMAN
By White & Haefliger
ATTORNEYS.

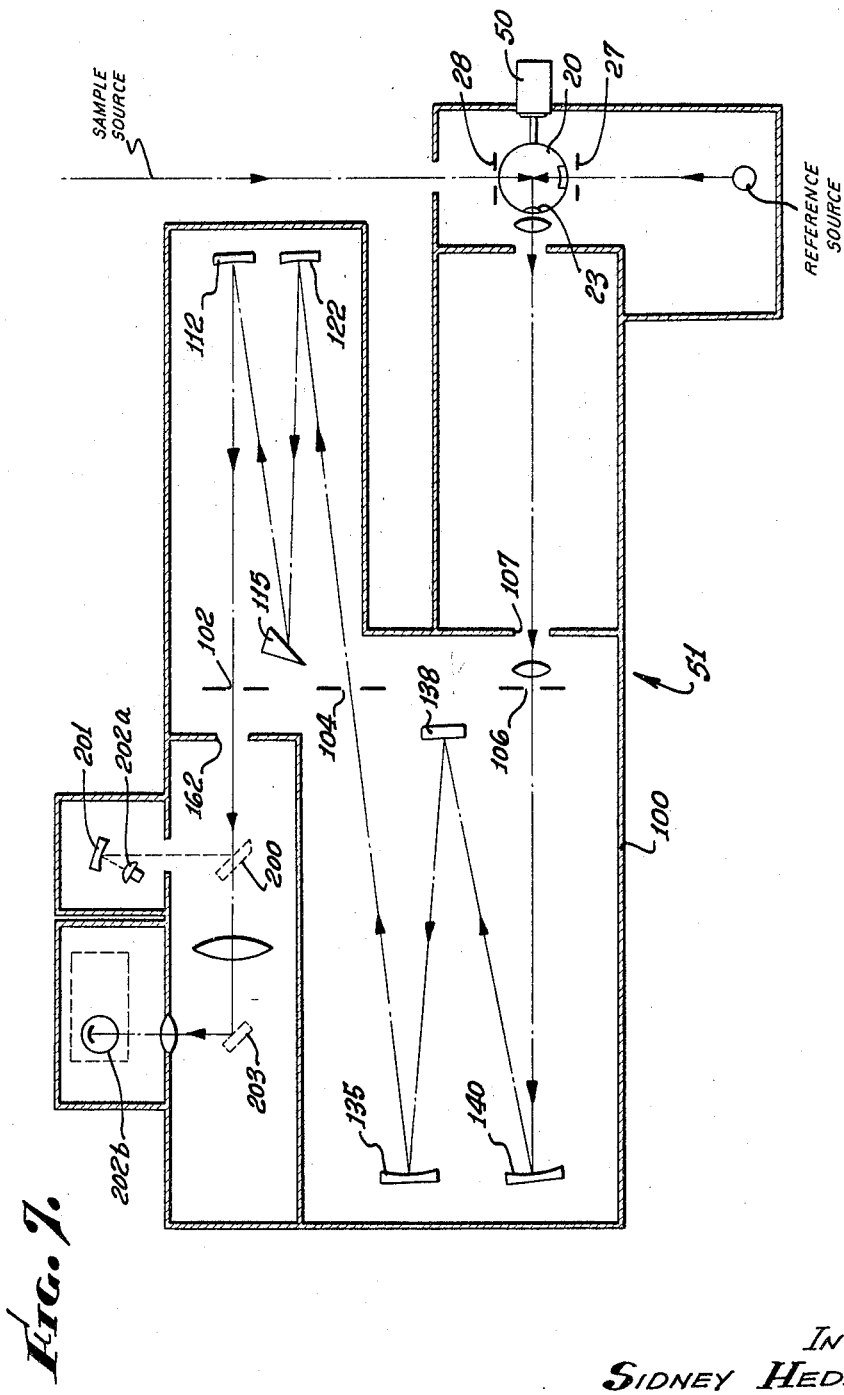

United States Patent Office 3,502,890
Patented Mar. 24, 1970

3,502,890
ROTATING SPHERE RADIOMETER
Sidney Hedelman, Los Angeles, Calif., assignor, by mesne assignments, to Cary Instruments, Monrovia, Calif., a corporation of California
Filed June 10, 1965, Ser. No. 462,814
Int. Cl. G01j 1/00, 3/42, 3/46
U.S. Cl. 250—228
21 Claims

ABSTRACT OF THE DISCLOSURE

The disclosed radiometer comprises a rotary hollow body having an inlet port through which radiation from a source or sources is received for diffusion within the body during cyclic relative rotation of the body and sources. The body has an outlet port through which radiation exits from the body interior, and means is provided to receive the exiting radiation and to generate signals corresponding to cyclically scanned source irradiance.

---

This invention relates generally to spectroradiometers and systems incorporating spectroradiometers. More specifically, the invention concerns unusual improvements in structure, mode of operation and results obtained in such equipment.

The search for tools to understand and control the properties of materials has stimulated scientists to develop highly sophisticated systems for dealing with the response of matter to ultraviolet, visible and infrared radiation. The control and measurement of spectral quality of the radiation has led to the evolution of a family of instruments providing powerful tools in the field of chemistry, physics, biology and medicine.

The growth of knowledge of the behaviour of matter influenced by light has led to a further need for measuring and controlling not only the spectral quality but also the quantity of light, as in the fields of illumination engineering, space technology where the destructive effects of the space environment must be controlled, and in the organic field where the level of radiation is an important factor in determining the nature and behaviour of complex molecules such as protein.

To evaluate sources of radiation their intrinsic characteristics must be measured. The important quantity is a source's spectral radiance (or brightness), which is the flux emitted per unit source area per unit projected solid angle as a function of wavelength. This quantity has units of watts/cm.$^2$-steradian-millimicron. In solar simulation the wavelength region of greatest interest is 2500–25,000 A. In establishing laboratory simulation conditions the ideal is to duplicate the sun's spectral radiance with a lamp or lamps to enable exposure experiments upon materials that will be part of spacecraft. In selecting sources for spectrophotometry, fluorimetry, actinometry and numerous other applications a knowledge of spectral radiance is a prime necessity. However, measuring the spectral radiance of a source is difficult, and has represented one of the most difficult instrumental challenges.

Briefly discussing photometry, when power from a source falls on a given area, the term irradiance is used to define the power per unit area of the illuminated area. Spectral irradiance is the irradiance per unit wavelength interval (milli-micron, or nanometer), the units being watts/cm.$^2$-m$\mu$. For purposes of measurement the irradiated area can be a slit or other aperture passing energy on to a detector for irradiance (watts/cm.$^2$) or through a monochromator to a detector for spectral irradiance (watts/cm.$^2$-m$\mu$). However it is not practically possible to directly relate the signal developed at a detector to the amount of energy falling on it, assuming the characteristics of any preceding monochromator and other optics were known. For these reasons standards of spectral radiance and spectral irradiance have been developed, with no little effort, and are available from the National Bureau of Standards. These are conveniently mounted lamps which have been calibrated by comparing them ultimately with black-body sources, relying upon the validity of the Stefan-Boltzmann and Planck laws of radiation.

Spectral irradiance can be related to spectral radiance if a standard lamp, whose spectral radiance is known, irradiates the same measurement aperture used by the unknown source. The measurement area, however, must subtend the same solid angle from each source as well as the same area. If both sources are far enough from the measurement aperture to behave as point sources (they follow the inverse square law) then the area of the source is no longer a contributing variable, hence, need not be taken into account.

One currently used photometric system includes a filter radiometer, consisting of a number of filters, usually interference filters, which isolate a series of wavelength intervals covering the range of interest, and a suitable detector. The response of the system to the standard lamp is noted, and then compared to the response to the unknown lamp for each filter, ratios providing the spectral irradiance for the unknown. Such instruments offer certain advantages; however, they suffer from lack of resolution, since the filter provides bandwidths typically around 20 m$\mu$ wide. The actual response of the system using a filter will be the convolution of the transmission characteristics of the filter, response characteristics of the detector, and of course, the source output over the range of wavelengths passed by the filter. Consequently, corrections may have to be made unless very narrow band filters are used, which are difficult to obtain and expensive. Further, more of the narrow-band filters would be required making the point-by-point calculations tedious unless an automatic filter system is employed, which may result in an apparatus as complicated as a monochromator. For example, a filter radiometer described by Stair employs 30 filters. The transmission will also be a function of temperature, time, and surface condition of the filters if frequent calibration is not performed.

When collecting optics are used, filter radiometers do not preclude the most difficult of the problems, that of detector-surface inhomogeneities which cause large uncertainties because of the unequal detector surface illumination from unknown and standard lamps of different geometery. Even though two lamps (standard and unknown) may be positioned identically with respect to the rest of the instrument, the energy from them isolated by the filters will still reflect the intensity distribution over the surface of the source. Coiled coils, ribbons, arcs, etc. have a different spectral radiance over their effective emitting surface which inevitably illuminates the detector somewhat differently. All detectors commonly used and of practical time response vary widely in their response over their surface. Thus, two sources of equal average spectral radiance may appear to be radically different because of very slight differences in detector illumination.

In another currently used system involving what is known as a substitution method, the entrance slit of a monochromator is illuminated first by the standard lamp and a whole spectrum recorded, and then another spectrum is recorded for the unknown which has to be mounted so that energy illuminates the slit exactly as the standard lamp did. Ratios must also be calculated at each wavelength of interest. Alternatively, the standard and unknown lamps can be interchanged each time the wavelength is changed, obtaining point-by-point ratios to preclude time variations in the monochromator, detector and associated electronics. This method can provide desirable resolution and sensitivity requirements; however, it is very sensitive to source inhomogeneities. It is almost impossible to compare ribbons, coils, coiled coils, arcs, the sun, etc., to the usual standard lamp (a coiled coil tungsten filament in a halogen filled quartz enevlope) because of the same detector surface illumination problem discussed in the filter radiometer method.

In still another system, the standard and unknown lamps can be compared using chopper coupling elements and the aforementioned ratio presented automatically as a function of wavelength. This method not only suffers from the same detector-illumination problem discussed in the first method, but also introduces uncommon elements into the optical train prior to the monochromator. Corrections are required for these elements, as for example aluminized mirrors or magnesium oxide plates, the properties of which may change with time.

The detector illumination problem can be overcome by illuminating the entrance slit of a monochromator through a port in an integrating sphere. A second port serves as the entrance port for standard or unknown source energy. The ports are placed to prohibit incoming radiation from striking that part of the sphere surface which is the source for the entrance slit. The sphere surface subtended by the solid angle formed between the exit port of the sphere and entrance slit is the new source for the monochromator. Because of the integrating effect of the sphere this surface will be illuminated identically for any source, except for average spectral irradiance. The solid angle and port size can be chosen such that the aperture stop of the monochromator is filled, ensuring maximum gathering power. The substitution method as discussed above may be used but this involves changing lamps and making tedious ratio calculations.

It is a major object of the present invention to overcome the disadvantages discussed above through the provision of a spectroradiometer and system incorporating same characterized by novel and unusual structure, mode of operation and improved results obtained in use thereof. Basically, the spectroradiometer is used where irradiation is transmitted from first and second sources, and it includes a shell having an axis, an inlet to pass said irradiation in offset relation to the axis and an outlet to pass irradiation at a locus proximate the axis, together with means to effect relative cyclic motion between the shell and sources, as for example relative rotation between the shell and sources about the axis. Also, the shell is given a highly reflective, uniform interior surface coating. In one form of the invention the integrating shell or sphere is rotated, permitting continuous scanning and viewing of each standard and unknown source through identical coupling optics, i.e. the shell inlet or window. The latter typically extends through an angle about the shell axis that is greater than zero and less than 180 degrees, and the standard and unknown sources are typically located at opposite sides of the shell axis as will appear.

Important advantages include the provision for nearly perfect path matching and the lack of need for calibration, inasmuch as the sample and reference sources irradiate very nearly the same areas of the shell. In certain multiple sphere spectroradiometers, on the other hand, the sample and reference look into auxiliary spheres, and furthermore, the main sphere in such systems must be carefully calibrated to eliminate whatever differences exist between the auxiliary sphere characteristics, as well as the difference between the parts and walls of the main sphere.

The invention also contemplates the provision of unusually advantageous means to receive irradiation emanating from the rotary shell outlet for use in ascertaining relative irradiance characteristics of the sources. Typically, such means includes a detector to generate signals corresponding to first and second source irradiance, a dispersing system coupling the output from the shell to the detector. The dispersing system typically includes a monochromator, and in this regard, another advantage of the single shell spectroradiometer of the invention is its substantially higher efficiency in power transfer from the sample to the monochromator, as compared with the operation of multiple shell systems.

These and other objects and advantages of the invention, as well as the details of an illustrative embodiment, will be more fully understood from the following detailed description of the drawings, in which:

FIG. 1 is a cross-sectional diagrammatic showing of a shell in the form of a sphere for dispersion and reintegration of light from two different radiators or sources, the shell mounted to rotate relative to the sources;

FIG. 2 is a perspective showing of a modified shell in the general form of a cylinder for dispersion and reintegration of light from two different sources;

FIG. 3 is a side elevation showing a spherical shell for dispersion and reintegration of light from two different sources, the latter mounted to rotate relative to the shell;

FIG. 7 is a layout of one form of monochromator coupling the irradiance from the rotary shell outlet to a detector.

Figure 4:
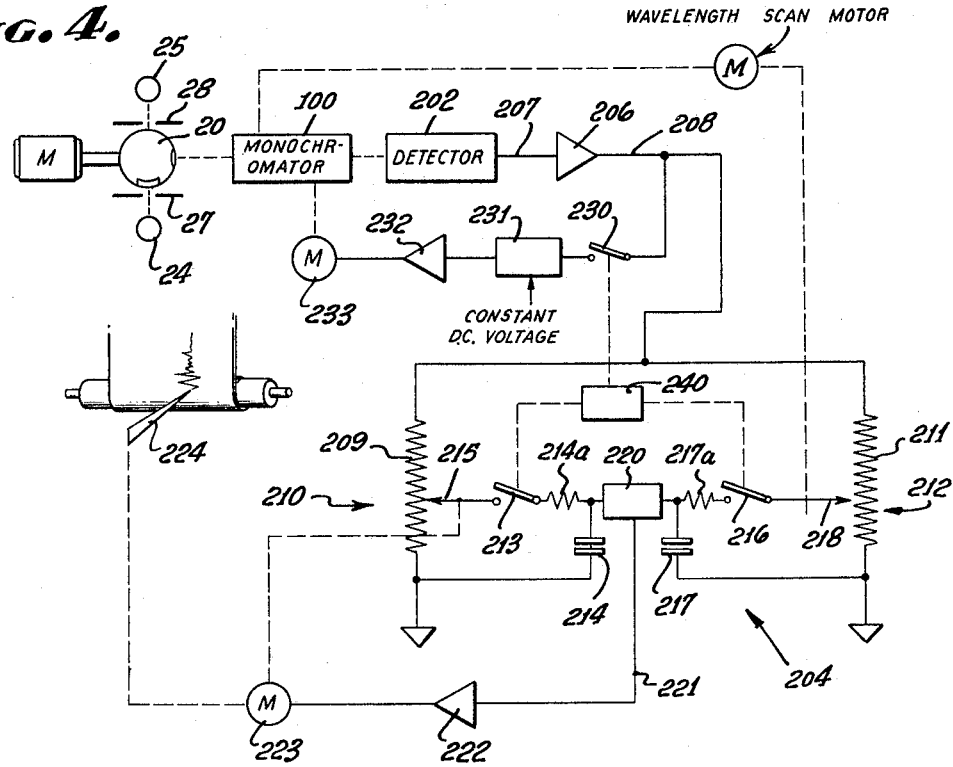
FIG. 4 is a schematic showing of one form of means to receive irradiation from the shell outlet for use in ascertaining relative irradiance characteristics of the two sources, the latter and the shell having relative rotation.

Referring first to FIG. 1, fixed position irradiation sources 10 and 11 are located at opposite sides of and equally distant from the axis 12 of rotation of a spherical shell 13. The latter has an inlet 14 to pass the irradiation from the sources in offset relation to the axis 12, as the sphere rotates, for dispersion and reintegration of light from first one source and then the other. Thus, the single rotating spherical shell acts as a chopper, producing a train of light pulses originating alternately from the two sources. In this regard, the diffuse reflectance sphere has a light diffusing interior coating indicated at 15, typical coatings consisting of barium sulfate or magnesium oxide. One form of means to rotate the sphere comprises a motor indicated at 16.

The sphere also has an outlet 17 to pass irradiance at a locus proximate the axis 12, and toward what may be characterized as means operable to ascertain relative irradiance characteristics of the sources 10 and 11. As will appear, such means may include a dispersing system, as for example a monochromator, and a detector to receive irradiance from the monochromator and to generate signals corresponding to first and second source irradiance. The inlet 14 may be defined by a single latitudinal slot extending about the axis 12 through an angle that is greater than zero and less than 180 degrees, and the outlet may for example be circular. The reference source 10 may comprise for example a working standard lamp that has been previously calibrated against a National Bureau of Standards lamp, the source 11 may comprise a solar simulator source.

Energy passing out of the sphere during illumination by each of the sources 10 and 11 originates at wall portion 19 which rotates around the central axis 12. The rotating sphere also provides for illumination of the same portion 19a of the sphere interior wall by both sources. These relationships are of distinct advantage, since they eliminate the effects of variations in sphere coating reflectivity on the ultimate ratio measurement. Wall portions 19 and 19a do not coincide, as is clear from FIG. 1.

FIG. 2 illustrates another form of shell 20 that is generally cylindrical and has an inlet window 21 extending for about 90 degrees about the shell axis 22 of rotation. An outlet window 23 is provided at one tapered end of the shell, and the latter is interiorly coated with magnesium oxide at 125, as before. Both windows 21 and 23 typically comprise a light passing solid material, as for example fused silica, preventing deterioration of the coating 125. Also, the shell 20 is typically purged with dry nitrogen and then sealed in a nitrogen atmosphere.

Figure 5:
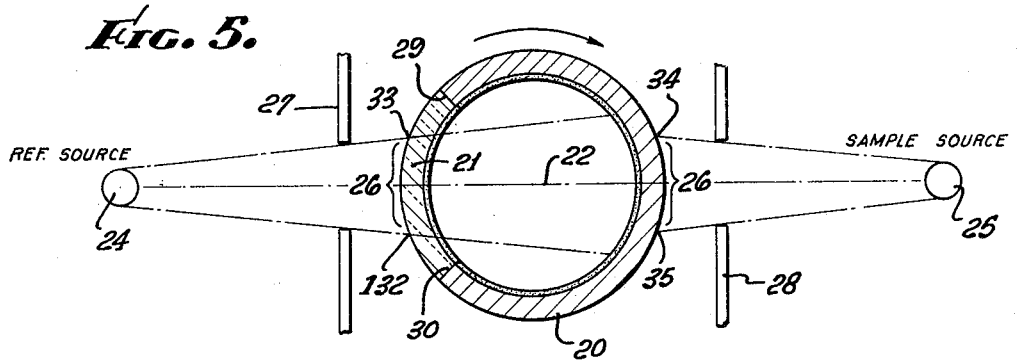
FIG. 5 is a schematic showing of a relationship between the FIG. 2 shell inlet and source irradiance control apertures for control of source irradiance sampling.

Irradiation sources for shell 20 are typically located at opposite sides thereof, as indicated schematically in FIG. 5. As there shown, the shell axis of rotation 22 is between the sources 24 and 25. Also, means is provided to limit the irradiation from each source incident at the inlet 21 to a beam width 26 that is less than the length of the slot 21 in the direction of shell rotation. For this purpose, aperture defining stops 27 and 28 may be provided, as indicated. The inlet window terminals are seen at 29 and 30.

Figure 6:
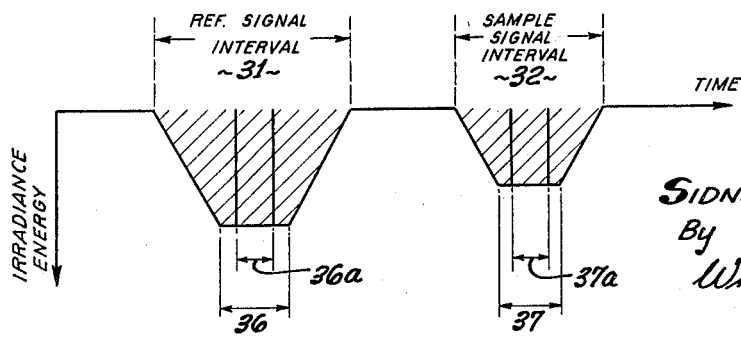
FIG. 6 is a diagram showing optical and electrical signal timing.

Referring now to FIG. 6, the indicated reference signal interval 31 corresponds to the interval between the time of arrival of window terminal 29 in FIG. 5 at the point 132 and the time of arrival of window terminal 30 at the point 33, where points 132 and 33 define the width 26 of reference source irradiance at the shell. Likewise, the reference signal interval 32 corresponds to the interval between the time of arrival of window terminal 29 at point 34 and the time of arrival of window terminal 30 at point 35, where points 34 and 35 define the width 26 of unknown source irradiance at the shell. Masks 27 and 28 are not necessary to all aspects of this invention, but produce the "flat" portions 36 and 37 of the irradiance-energy-vs-time trace as represented in FIG. 6, and this is desirable (with certain types of electronic systems for detecting and measuring the energy from the sphere outlet port) in optimizing time-sampling of the irradiance energy.

Also in FIG. 6, the indicated interval 36 corresponds to the interval between the time of arrival of window terminal 29 in FIG. 5 at the point 33 and the time of arrival of window terminal 30 at point 132; and the interval 37 in FIG. 6 corresponds to the time of arrival of window terminal 29 in FIG. 5 at the point 35 and the time of arrival of terminal 30 at point 34. During intervals 36 and 37 maximum or constant energy is transmitted through the shell outlet. The actual sampling intervals are indicated at 36a and 37a, which are within, but typically shorter than, constant output energy intervals 36 and 37.

Referring now to FIG. 3, the arrangement there shown includes a spherical shell 40 of the same construction as shell 13 in FIG. 1, having inlet 41 and outlet 42. Two irradiance sources 43 and 44 are mounted equidistantly from the shell axis 45, and at opposite sides thereof; however, in this case the sources are rotated about axis 45 as by the mounting structure 46 driven by motor 47.

Referring now to FIG. 7, a FIG. 2 type shell 20 is shown as rotatable within a housing by motor 50. The irradiance energy passing through the outlet 23 then passes through the dispersing system indicated generally at 51. The latter may comprise a double monochromator 100 of the type described in U.S. Patent 3,098,408 to H. H. Cary. Briefly, the irradiation energy enters the monochromator at 107, passes through controllable slit 106 (which is imaged at the internal wall portion 19 of shell 20 opposite shell outlet 23) and is reflected by collimating mirror 140 to the diffraction grating 138 of reflection grating type. (Grating 138 is imaged at shell outlet 23.) The latter is rotatable to vary the nominal wavelength of the monochromatic irradiation which is to be produced by the monochromator. Either slit 106 or grating 138 may conveniently be imaged on the outlet 23 and rear surface 19 respectively, but the arrangement described above is the most efficient in practice.

From grating 138 the irradiation travels to mirror 135 from which it is reflected to travel through controllable slit 104. The radiation is again reflected at mirror 122 to travel to dispersing prism 115. The latter is characterized by higher dispersion and higher resolving power at shorter wavelengths, whereas the diffraction grating is characterized by higher dispersion and higher resolving power at higher wavelengths. The prism is controllably rotatable with the diffraction grating to scan a spectrum over a wide range, as described in said Cary patent. Also, the prism monochromator is always set to the same wavelength as the grating monochromator. Monochromatic irradiant energy leaving the prism is reflected by mirror 112 to pass through controllable slit 102, leaving the monochromator at window 162. A typical monochromator of this type incorporated in the Cary Model 14, manufactured by Cary Instruments, formerly Applied Physics Corporation, of Monrovia, Calif., provides from 10 angstrom per millimeter reciprocal dispersion in the ultraviolet to 35 angstrom per millimeter in the near infrared. It also provides a wavelength range of from 1860 angstroms to 2.65 microns.

Alternate pulses of sample and reference light in the red and infrared range (7,000 A.–25,000 A.) dispersed by the monochromator are directed by mirrors 200 and 201 to detector component 202a, the latter typically consisting of a lead sulfide photocell. Similarly, alternate pulses of sample and reference light in the ultraviolet-to-red range (1860–7000 A.) dispersed by the monochromator are directed by mirror 203 to detector component 202b, the latter typically consisting of a photomultiplier tube.

Referring now to FIG. 4, means is coupled to the detector 202 to provide a comparison of versions of the sample and reference signals generated by the detector. One form of such means, as illustrated, includes an amplifier 206 having its input coupled at 207 to the detector output, the amplifier output at 208 being applied to parallel slidewire 209 of potentiometer 210 and slidewire 211 of potentiometer 212. During the sampling interval 36a as seen in FIG. 6, a relay 213 remains closed to store on reference capacitor 214 a charge at a voltage proportional to the amplified reference signal from detector 202, attenuated by a portion of the slidewire 209 determined by the position of the potentiometer wiper arm 215. Likewise, during the sampling interval 37a as seen in FIG. 6 a relay 216 remains closed to store on capacitor 217 a charge at a voltage proportional to the amplified "unknown" signal from detector 202, attenuated by a portion of the slidewire 211 determined by the position of the potentiometer wiper arm 218. Resistors 214a and 217a interposed between relay 213 and capacitor 214 and between relay 216 and capacitor 217, respectively, tend to average the voltages over the intervals 36a and 37a and to reduce any random noise components in such voltages.

A comparator 220 compares the voltages stored on the two capacitors 214 and 217, and if they are not equal, the comparator output error signal effects readjustment of the wiper arm 215 to balance the capacitor charges. For example, a comparison relay may develop an AC signal whose amplitude is proportional to the difference in DC level between the stored signals on the two capacitors. The comparator output at 221 is typically applied to a recorder pen amplifier 222 driving a servo motor 223 operating a recorder pen 224 and the wiper arm 215. Accordingly, the pen records the ratio of the "sample" signal to the "reference" signal, and may be set to provide readings directly in spectral irradiance vs wavelength. Also, potenitometer 212 may be set to allow the recorder reading to be adjusted to indicate a certain value when a known source is substituted for the unknown source for the purpose of calibration or the like.

Also, during the reference interval 36a, a switch 230 is closed and the reference signal is compared to a fixed DC voltage, as for example by comparator 231. The latter may incorporate a comparison relay to develop an AC signal whose amplitude is the difference between the reference channel signal and the DC reference. This error signal is amplified as at 232 and used to drive a servo motor 233, which reduces the slit openings 102, 104 and 106 of the monochromator if the reference signal is too high and increases the slit openings if the reference signal is too low. As a result, the reference signal is kept approximately constant at slidewire 209, and the instrument operates at constant signal to noise ratio independently of wavelength.

The high speed relays 213, 216 and 230 may be suitably mechanized and operated in response to timing signals provided by a signal generator 240. The latter may include suitable chopper and photocell elements operated in synchronism with the timing of dark periods between pulses of monochromatic light from the sample and reference.

While the invention has been described with regard to comparison of ultraviolet, visible and infrared radiation from two sources, it will be clear to one skilled in the art that the principles disclosed herein, and the claims appended hereto, apply as well to propagating energy of many different sorts. Such energy includes X-, $\gamma$- and $\beta$-rays, radio waves, and even acoustic energy propabation. Such principles apply as well to coupling of energy from a multiplicity of sources, or (in regard to certain of the appended claims) even a single source.

I claim:

1. Apparatus adapted to receive and process radiant energy from at least a first and a second source, said apparatus comprising, in combination:
    a hollow shell adapted to receive radiation from such sources;
    means to effect substantially continuous unidirectional relative cyclic motion between said shell and such sources;
    the shell having an inlet located for the passage of radiation alternately from such sources into the shell interior, in the course of said cyclic motion; and
    the shell having an outlet for the passage of radiation from the shell interior to the shell exterior.

2. Apparatus adapted for use in comparing radiation from at least first and second sources, said apparatus comprising:
    a hollow shell having an axis;
    means to effect substantially continuous cyclical relative rotation in the same angular direction between said shell and such sources about said axis, the shell having an inlet located to pass said radiation alternately from such sources in response to said rotation and said inlet being offset from said axis; and
    the shell having an outlet to pass radiation at a locus proximate said axis.

3. The combination of claim 2 in which said inlet extends through an angle about said axis that is greater than zero and less than 180 degrees.

4. The combination of claim 2 including means to limit the irradiation incident at said inlet to a width that is less than the length of said inlet in the direction of said relative rotation, and said inlet and outlet being defined by radiation-passing solid material and the interior of the shell being sealed with respect to the shell exterior.

5. The combination of claim 2 including such first and second sources which are located at opposite sides of said axis, said last named means rotating said shell relative to said sources.

6. The combination of claim 5 in which said first and second sources are located at opposite sides of said shell.

7. The combination of claim 2 including means to receive irradiation emanating from said outlet for use in ascertaining relative irradiance characteristics of said sources.

8. The combination of claim 7 in which said last named means includes a detector to generate signals corresponding to first and second source irradiance.

9. The combination of claim 7 in which said last named means includes a dispersing system and a detector to receive irradiation therefrom and to generate signals corresponding to first and second source irradiance.

10. The combination of claim 9 in which said dispersing system includes a monochromator.

11. The combination of claim 9 in which said dispersing system includes a pair of slits one of which is imaged at the shell outlet and the other of which is imaged at the shell interior wall opposite said outlet.

12. The combination of claim 9 including means to compare versions of said signals to derive a ratio thereof.

13. The combination of claim 2 in which said shell is substantially spherical.

14. The combination of claim 2 in which the shell has an optically diffusing inner surface portion.

15. The combination of claim 7, also comprising means to selectively limit the wavelength bandwidth of radiation transmitted from such sources to said receiving means.

16. The combination of claim 15, wherein:
    said receiving means comprises a detector to receive radiation emanating from said outlet and to generate signals corresponding to radiance from said first and second sources respectively; and
    said selectively limiting means comprises means disposed to intercept radiation traveling between at least one of said sources and said detector, and characterized by a wavelength-dependent transmission efficiency for such radiation.

17. Apparatus for use in measurement of the intensity of propagating energy, comprising:
    a shell having an inlet port and an outlet port adapted for the passage of such propagating energy, and mounted for rotation about an axis which passes through said exit port;
    means for cyclically rotating said shell substantially continuously and in the same angular direction about said axis, whereby said entrance port is alternately in position to admit and not to admit such propagating energy to the interior of said shell;
    diffusing means internal to said shell for producing from such propagating energy, after passage through said inlet port, a diffused version thereof for passage through said outlet port; and
    means disposed to receive such propagating energy from said outlet port, and to generate, in response to such propagating energy, signals in correspondence with the intensity thereof.

18. The apparatus of claim 17, such propagating energy arising in source means for generating an output of such propagating energy, said apparatus also comprising:
    means for positioning such source means and said shell relative to one another so that such propagating energy, upon passage through said inlet port, first impinges within said shell in an area defined upon an interior surface of said shell, no part of said area being in common with any part of said outlet port.

19. The apparatus of claim 18, wherein:
    said receiving means is exposed by said outlet port to a portion of the interior surface of said shell, said portion being substantially nonvarying in the course of rotation of said shell, and said portion having no parts in common with parts of said interior surface defining said first-impinged-upon area.

20. The apparatus of claim 18, wherein such source means comprise a plurality of distinct sources of such propagating energy, and said positioning means being further characterized in that:
    as said inlet port sequentially admits such propagating energy from such distinct sources, said first-impinged-upon area is substantially the same for all such sources.

21. Apparatus for effecting diffused transmission of propagating energy to means for detecting such energy, when such detecting means is suitably juxtaposed thereto, comprising:
- a shell having an inlet port and an outlet port adapted for the passage of such propagating energy, and mounted for rotation about an axis which passes through one of said ports;
- diffusing means internal to said shell for producing from such propagating energy, after passage through said inlet port, a diffused version thereof for passage through said outlet port; and
- means for substantially continuously cyclically rotating said shell and in the same angular direction about said axis, whereby such propagating energy is alternately diffusely transmitted by and not transmitted by said shell to such detecting means.

References Cited

UNITED STATES PATENTS

| | | | |
|---|---|---|---|
| 1,672,672 | 6/1928 | Young | 250—228 X |
| 2,189,270 | 2/1940 | Pineo | 250—228 X |
| 2,383,075 | 8/1945 | Pineo | 250—228 X |
| 2,411,741 | 11/1946 | Michaelson | 250—228 X |

OTHER REFERENCES

Hammond, "Spectroradiometry by Means of Modified Spectrophotometers," Applied Optics, vol. 2, No. 11, November 1963, pp. 1207–8.

RALPH G. NILSON, Primary Examiner

M. A. LEAVITT, Assistant Examiner

U.S. Cl. X.R.

088—014, 023; 350—271; 356—097, 179, 230